Jan. 20, 1925.

J. V. GIESLER

VALVE

Filed Feb. 9, 1920

1,523,953

Inventor

Jean V. Giesler

By Mauro, Cameron, Lewis & Keskau

Attorneys

Patented Jan. 20, 1925.

1,523,953

UNITED STATES PATENT OFFICE.

JEAN V. GIESLER, OF KNOXVILLE, TENNESSEE, ASSIGNOR TO THE FULTON COMPANY, OF KNOXVILLE, TENNESSEE, A CORPORATION OF MAINE.

VALVE.

Application filed February 9, 1920. Serial No. 357,146.

*To all whom it may concern:*

Be it known that I, JEAN V. GIESLER, a citizen of the United States, and resident of Knoxville, Tennessee, have invented new and useful Improvements in Valves, which invention is fully set forth in the following specification.

This invention relates to valves and, while capable of use with valves of a variety of forms, has particular utility when applied to radiator valves of the quick-opening type.

It has heretofore been proposed to provide a valve with cooperating right and left hand threaded members for effecting a rapid opening and closing of the valve by the rotation of an operating member through 360° or less. All constructions of this type of which I am aware have been more or less complicated, expensive and difficult of assembly. It is an object of this invention to provide a valve of the type characterized of simplified construction whereby the same may be inexpensively manufactured in large quantities and whereby their assembly and adjustment are facilitated.

Another object of this invention is to provide a valve of the type characterized which employs a minimum number of relatively movable threaded connections in the operating train of the valve.

It has also been proposed heretofore to employ relatively movable reversely threaded members in the operating train of a valve of the so-called "packless" type, but in all such constructions of which I am aware the flexible wall forming a fluid-tight joint between the valve member and its casing has been so subjected to rotative torque as to tend to rupture said wall and destroy the fluid-tight joint. It is an object of this invention to provide a valve comprising a flexible wall for forming a fluid-tight joint between the valve member and its casing with cooperating reversely threaded members for operating the same so constructed and arranged that no rotative torque is transmitted to said flexible wall.

A further object of this invention is to provide a valve of the graduated quick-opening type with an improved axially and circumferentially adjustable index plate whereby the same may be initially set and subsequently adjusted to correctly indicate or control the positions of the valve.

Other objects relate to the provision of a valve of the type in question which may be readily assembled and disassembled for inspection and repair and readily adjusted for the proper control of the flow of the heating medium; and one which, while simple in construction and inexpensive to make and assemble, is strong, durable and efficient in operation.

The invention is capable of receiving a variety of mechanical expressions, one of which is shown on the accompanying drawing, but it is to be expressly understood that the drawing is for purposes of illustration only and is not to be construed as a definition of the limits of the invention, reference being had to the appended claims for that purpose.

In said drawing:—

Figure 1:
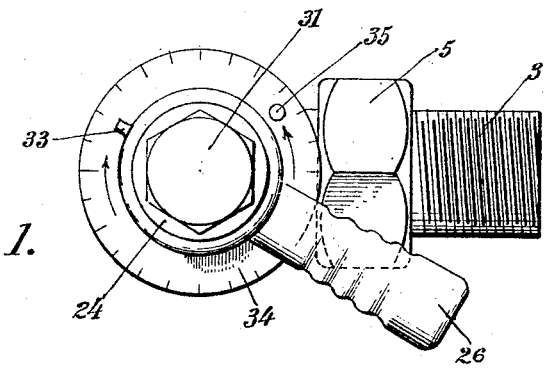
Fig. 1 is a top plan view of a valve embodying the present invention.
Figure 2:
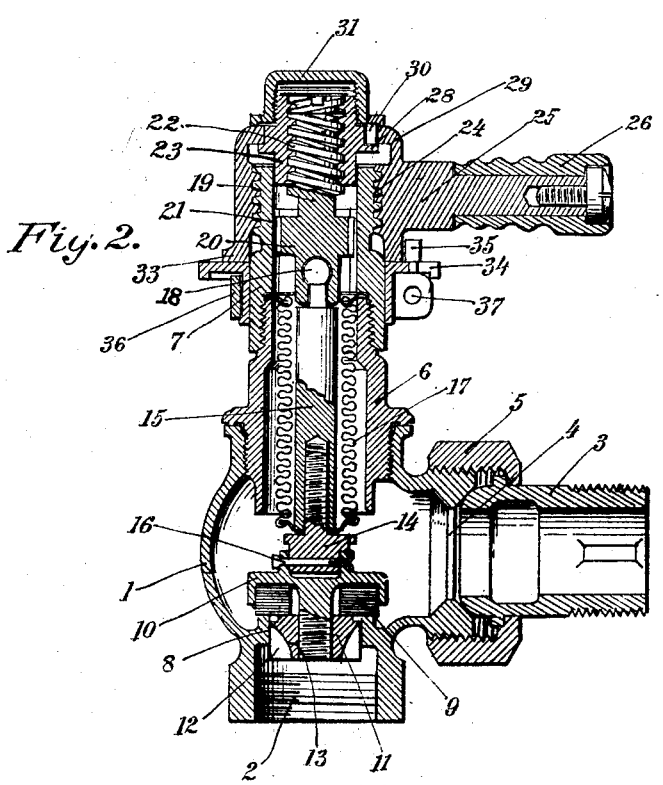
Fig. 2 is a vertical axial section through the housing of said valve.

In the form shown, wherein the invention is illustrated as embodied in a radiator valve of the graduated quick-opening type, 1 designates a valve casing of any suitable construction provided with an inlet 2 and the usual tail-piece 3 for connection to the radiator, retained in operative relation to the outlet 4 by the nut 5. The bonnet portion of said casing may also be constructed in any suitable way, being shown as comprised of two sections. The lower section 6 constitutes a housing for the flexible wall to be described and is threaded into the body portion of said casing; and the upper section 7 is threaded onto said lower section 6 and constitutes the fixed member of the operating train to be described hereinafter.

Figure 3:
Fig. 3 is a bottom plan view of the member for guiding the movements of the valve disk and predetermining the flow of the heating medium.

Said casing 1 is provided with a suitable valve opening 8 with which cooperates a closure member or valve disk 9, of any suitable construction, carried by the disk holder 10. Said disk holder is preferably provided with an extension 11 which fits loosely within the valve opening 8 and serves the dual function of guiding the closure member in its movements and of controlling the flow of the heating medium through said opening. To perform the latter function, said extension 11 may be given any suitable formation. As illustrated more particularly in Fig. 3, the extension 11 is shown as provided with four wings 12 connected by curved portions 13 whereby the quantity of heating medium flowing through the opening 8 for each position of the closure member may be accurately predetermined. It is to be expressly understood, however, that any other suitable form of guide member may be employed if desired. The disk holder 10 is suitably connected to the lower end 14 of the valve stem, which is desirably made separate from and has threaded engagement with the body portion 15 of the valve stem, said valve stem being attached to said disk holder in any suitable way, as by a split pin 16.

In the preferred embodiment of the present invention, the valve is made of the "packless" type and to this end a flexible wall is provided intermediate the casing and the closure member and makes fluid-tight joints therewith. The flexible wall may be of any suitable construction, being shown as a corrugated expansible and collapsible tubular wall 17 of any suitable material, preferably resilient metal, firmly gripped between the sections 6 and 7 of the casing to form a fluid-tight joint therewith and firmly gripped between the lower portion 14 and the body portion 15 of the valve stem to form a fluid-tight joint therewith.

The body portion 15 of said valve stem is preferably made in two parts which are flexibly connected in any suitable way. In the form shown, the lower part is provided with a T-shaped projection 18 comprising a pin which engages in a corresponding slot in the upper part 19 of said valve stem. To prevent rotation of said valve stem and, therefore, to prevent transmission of rotative torque to the flexible wall 17, said upper section 19 of the valve stem is provided with one or more ribs or projections 20 which engage in a corresponding slot or slots 21 provided in the wall of the section 7 of the casing, said member 19 of the valve stem being in effect keyed to the section 7 of said casing to the end that the member 19 may have axial movement with respect to said casing but may not rotate relatively thereto. The upper end of the member 19 is provided with a coarse thread 22, shown as a left-hand thread, in engagement with a corresponding internal thread on a cooperating member or nut 23.

The exterior wall of the section 7 is also provided with a coarse thread 24 which is reverse to the thread on the member 19 and therefore, in the form shown, a right-hand thread. In engagement with the thread 24 is a cooperating hand-grasp member 25 provided with a corresponding interior thread, said member 25, in the form shown, being provided in any suitable way with a handle 26 for convenience of operation. Said members 23 and 25 are unitarily connected in any suitable way so as in effect to constitute a single member composed of two parts one surrounding the other. In the form shown, the nut 23 is provided with a peripheral flange 28 and the member 25 is provided with an upwardly-extending and inwardly-directed flange 29 which is suitably interlocked with the flange 28, as by the pin 30, to prevent relative rotation. To prevent relative axial displacement of said members 23 and 25 a cap 31 is threaded on to the projecting end of the member 23 and bears on the upper surface of the inwardly-directed flange 29, a lock washer being interposed between said cap and member 25 if desired.

To index and limit the rotation of the operating or hand-grasp member 25, the latter is preferably provided with a projection or pointer 33 and, mounted on the section 7 of the casing below the member 25, is an index plate 34 provided with an upwardly-extending projection or pin 35 for cooperation with the projection 33. Plate 34 is also suitably provided with index marks as indicated in Fig. 1. In order that said index plate 34 may be initially set and subsequently adjusted to accurately indicate and control the movement of the valve, the index plate 34 is preferably made axially and circumferentially adjustable and, to this end, is mounted to be freely movable longitudinally and rotatably on the section 7 of the casing. Suitable means are provided to clamp said index plate 34 in adjusted position. In the form shown, a split ring 36 embraces a downwardly-extending flange on said index plate and may be operated by a screw (not shown) received in the apertures 37 to release or clamp said index plate in any position to which it may be moved.

It will therefore be perceived that a valve structure has been provided which may be readily assembled. The flexible wall 17 may be readily clamped between the lower portion 14 and the body portion 15 of the valve stem and between the sections 6 and 7 of the casing and the section 6 readily applied to the body portion of the casing. The nut 23 may be readily applied to the upper end of the valve stem and, the index plate 34 having been previously clamped in position on the section 7 by the split ring 36, the operating or hand-grip member 25 may be readily applied to the external threads on the section 7. The nut 23 having been rotated until the closure member is in engagement with the valve seat and member 25 having been suitably positioned to correspond with the closed position of the valve disk, the hole for the pin 30 can be readily drilled and the members 23 and 25 interlocked by the pin 30 to prevent relative rotation. The cap 31 can then be applied to the member 23 and, having been screwed tightly into position, prevents relative displacement of the members 23 and 25. The members 23 and 25 and cap 31 therefore constitute a unitary member the parts of which are effectively locked against relative displacement.

In operation, the closure member or valve disk can be readily operated by rotating the member 25 in one direction or the other. Rotation of said member 25 is accompanied by an axial movement thereof owing to the coarse thread 24 between said member and the casing section 7, and axial and rotative movement of said member 25 produces both axial and rotative movement of the member 23 owing to the unitary connection therebetween. The axial movement of member 23 is transmitted to the valve stem 15, and the rotative movement of said member 23 produces an additional axial movement of the valve stem 15 owing to the coarse thread 22 between said stem and the member 23 while relative rotation of said stem is prevented by the interlock provided by the ribs 20 and grooves 21. Therefore the valve stem and the closure member connected thereto are moved axially as a result of the compounded action of the reverse threads 22 and 24. Furthermore the open and closed positions of the valve disk can be accurately indicated and controlled by adjustment of the index plate 34 which, upon loosening the split ring 36, may be axially and circumferentially adjusted, and then clamped in adjusted position by tightening said ring 36. The coaction of pointer 33 and projection 35 effectively limits the movement of the closure member, but the engagement of member 23 with member 19 may also be relied upon to prevent excessive movement of the valve disk. Therefore, without the use of excessively steep threads, the valve may be effectively opened and closed by a rotation of the operating member 25 through 360° or less. While a single thread has been shown between the members 19 and 23 and between the member 25 and section 7, it is to be understood that double or triple threads may be employed if desired.

As rotation of the valve stem is positively prevented by the engagement of the rib or ribs 20 and the slot or slots 21 no torque is transmitted to the flexible wall 17, particularly where said stem is made in two sections as shown and the section not in engagement with the flexible wall is positively prevented from rotation. Therefore, the reversely threaded members are available for operating a "packless" valve without danger of rupturing the flexible member which provides the fluid-tight joint.

It will furthermore be perceived that a valve structure has been provided which employs only two reverse threads in the operating train of the valve disk, and which, while composed of a minimum number of simple parts which may be readily assembled and disassembled for inspection and repair, so that the valve may be inexpensively manufactured in large quantities, is strong and durable in construction and capable of efficiently controlling the flow of the heating medium.

While the embodiment of the invention illustrated on the drawing has been described with considerable particularity it is to be expressly understood that the invention is not limited thereto as the same is capable of receiving a variety of mechanical expressions, some of which will now readily suggest themselves to those skilled in the art, while changes may be made in details of form, arrangement and construction of parts, and some of the features used without other features thereof, without departing from the spirit of this invention. Reference is therefore to be had to the claims hereto appended for a definition of the limits of the inveniton.

What I claim is:

1. In a valve, in combination with a casing provided with a valve opening and a cooperating closure member, a flexible wall having fluid-tight joints with said closure member and casing, means for operating said closure member comprising cooperating members having right and left hand threaded connections, and means intermediate said members and wall to prevent the torque created by relative rotation of said members from being transmitted to said flexible wall.

2. In a valve, in combination with a casing provided with a valve opening and a cooperating closure member, a flexible wall having fluid-tight joints with said closure member and casing, a stem connected to said closure member and provided with a thread, a cooperating threaded member, a reversely threaded member for rotating said last-named member, and means for preventing substantial rotation of said stem and the transmission of rotative torque to said flexible wall.

3. In a valve, in combination with a casing provided with a valve opening and a cooperating closure member, a flexible wall having fluid-tight joints with said closure member and casing, a stem connected to said closure member and provided with a thread, a cooperating threaded member, a member unitarily connected to said last-named member and provided with a reverse thread cooperating with a corresponding thread on the casing, said threaded members cooperating to compound their movements in the same direction and means to prevent substantial rotation of said stem and the transmission of rotative torque to said flexible wall.

4. In a valve, in combination with a casing provided with a valve opening and a cooperating closure member, a flexible wall having a fluid-tight joint with said casing, a two-part stem having its sections flexibly connected and its inner section connected fluid-tight to said flexible wall, means for operating said stem and closure member comprising cooperating members having right and left hand threaded connections, and means to prevent substantial rotation of the outer section of said stem.

5. In a valve, in combination with a casing provided with a valve opening and a cooperating closure member, a flexible wall having a fluid-tight joint with said casing, a two-part stem having its inner section connected fluid-tight to said flexible wall and its outer section provided with a thread, a cooperating threaded member, reversely threaded means for rotating said last-named member, and means to prevent substantial rotation of the outer section of said stem.

6. In a valve, in combination with a casing provided with a valve opening and a cooperating closure member, a flexible wall having a fluid-tight joint with said casing, a two-part stem having its inner section connected fluid-tight to said flexible wall and its outer section provided with a thread, a cooperating threaded member, a member unitarily connected to said last-named member and provided with a reverse thread cooperating with a corresponding thread on the casing, and means to prevent substantial rotation of the outer section of said stem.

7. In a quick-opening valve, in combination with a casing provided with a valve opening and a cooperating closure member, a non-rotatable stem connected to said closure member and provided with an exterior thread, a cooperating nut rotatable with respect to said stem, a hand-grasp member surrounding and unitarily connected to said nut and provided interiorly with a reverse thread, and an exterior thread on said casing with which said last-named thread cooperates and so arranged that said hand-grasp member compounds its movement with said nut in the same direction.

8. In a quick-opening valve, in combination with a casing provided with a valve opening and a cooperating closure member, a two-part stem connected to said closure member and provided with a transverse pin-and-slot connection between said parts to prevent relative rotation, means cooperating with one of the parts of said stem to prevent rotation of said stem, reversely threaded cooperating members connected with said last-named part for moving said stem longitudinally to operate said closure member, and a flexible wall having fluid-tight joints with said casing and the other part of said stem.

9. In a quick-opening valve, in combination with a casing provided with a valve opening and a cooperating closure member, a two-part stem connected to said closure member and provided with means between said parts providing a flexible joint but preventing substantial relative rotation, a flexible wall making fluid-tight joints with said casing and one part of said stem, means cooperating with the other part of said stem to prevent substantial rotation of said stem, and reversely threaded cooperating members for moving said stem longitudinally to operate said closure member.

10. In a valve, in combination with a casing provided with a valve opening and a cooperating closure member, a stem connected to said valve member and having adjacent its outer end a keyed connection with said casing whereby said stem may move axially but not rotatably, a flexible wall having fluid-tight joints with the inner end of said stem and said casing, and reversely threaded cooperating members connected with the outer end of said stem for moving the same longitudinally.

11. In a valve, in combination with a casing provided with a valve opening and a cooperating closure member, a stem connected to said closure member and provided with a thread, a cooperating threaded member provided with a flange, an operating member having a reversely threaded connection with said casing and a flange projecting into cooperative relation with said first-named flange, and means interlocking said flanges to prevent relative rotation.

12. In a valve, in combination with a casing provided with a valve opening and a cooperating closure member, a stem connected to said closure member and provided with a thread, a cooperating threaded member provided with a flange, an operating member having a reversely threaded connection with said casing and a flange projecting into cooperative relation with said first-named flanges, means interlocking said flanges to prevent relative rotation, and means on said threaded member for preventing relative axial displacement of said operating and threaded members.

13. In a graduated, quick-opening valve, in combination with a casing provided with a valve opening and a cooperating closure member, reversely threaded cooperating members for operating said closure member, one of said members being an axially and rotatably movable hand-grasp member provided with indicating means, an axially and circumferentially adjustable index plate cooperating therewith, and means for clamping said index plate in adjusted position.

14. In a valve, in combination with a casing provided with a valve opening and a cooperating closure member, a flexible wall having fluid-tight joints with said closure member and casing, a stem connected to said closure member and provided with a thread, a cooperating threaded member, a second member separably but unitarily connected to said last-named member and provided with a reverse thread cooperating with a corresponding thread on the casing, and means for preventing substantial rotation of said stem and the transmission of rotative torque to said flexible wall.

15. In a valve, in combination with a casing provided with a valve opening and a cooperating closure member, a member connected to said closure member and provided with a thread, a second cooperating threaded member, an operating member having a reversely threaded connection with said casing, and a threaded cap on said second member engaging said operating member to prevent relative displacement thereof.

16. In a valve, in combination with a casing provided with a valve opening and a cooperating closure member, a member connected to said closure member and provided with a thread, a second cooperating threaded member, an operating member having a reversely threaded connection with said casing, means interlocking said operating and second members to prevent relative rotation, and means on said second member engaging said operating member to prevent relative axial displacement.

17. In a valve, in combination with a casing provided with a valve opening and a cooperating closure member, a non-rotatable longitudinally movable stem connected to said closure member and provided with a thread, a nut rotatable with respect to said stem, a hand-grasp member having a reversely threaded connection to said casing, and a threaded cap on said nut and engaging said hand-grasp member to prevent relative displacement.

18. In a valve, in combination with a casing provided with a valve opening and a cooperating closure member, a non-rotatable longitudinally movable stem connected to said closure member and provided with a thread, a nut rotatable with respect to said stem, a hand-grasp member surrounding and non-rotatably connected to said nut, a cap on said nut engaging said hand-grasp member to prevent relative axial displacement, and a reversely threaded connection between said hand-grasp member and casing.

19. In a valve, in combination with a casing provided with a valve opening and a cooperating closure member, a two part stem connected to said member and provided with means between said parts providing a flexible joint but preventing substantial relative rotation, a flexible wall making fluid-tight joints with said casing and one part of said stem, means cooperating with the other part of said stem to prevent substantial rotation of said stem, and means for moving said stem longitudinally to operate said closure member.

In testimony whereof I have signed this specification.

JEAN V. GIESLER.